(No Model.) 2 Sheets—Sheet 1.
J. W. PIERCE & I. L. G. RICE.
WHEEL TIRE.
No. 340,612. Patented Apr. 27, 1886.
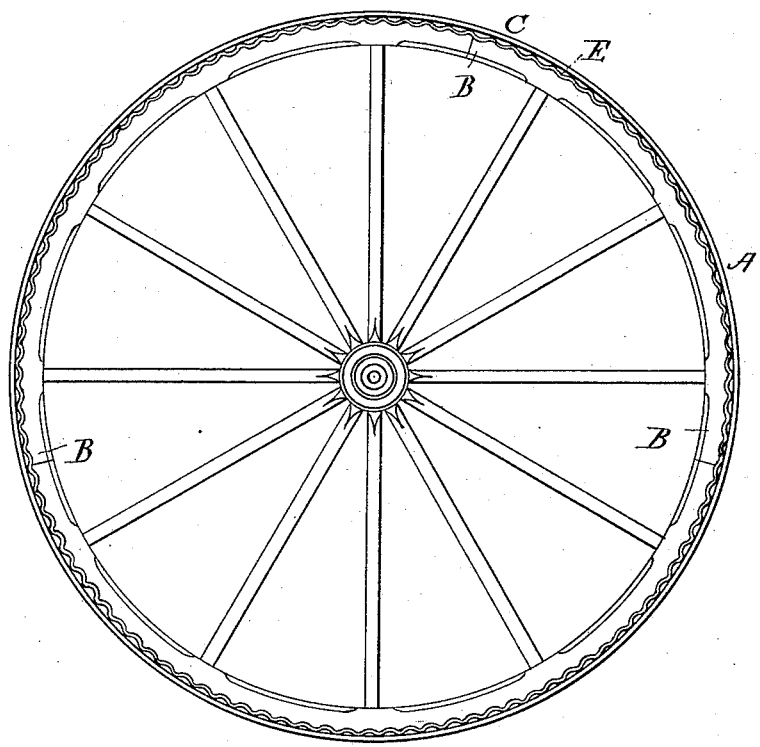
Fig. 1.
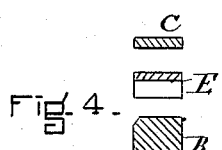
Fig. 4.
Fig. 2.
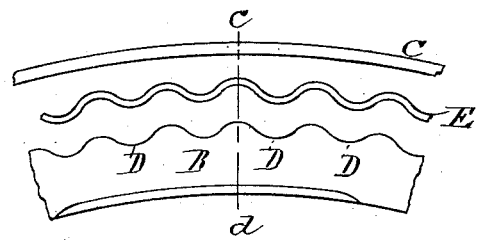
Fig. 5.
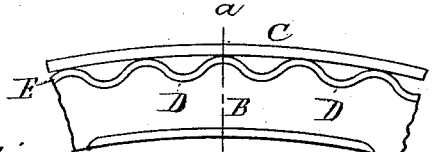
Fig. 3.
WITNESSES.
Chas. Spaulding
Albert D. Grover
INVENTORS.
J Willard Pierce
Israel L. G. Rice (No Model.) 2 Sheets—Sheet 2.

J. W. PIERCE & I. L. G. RICE.
WHEEL TIRE.

No. 340,612. Patented Apr. 27, 1886.

WITNESSES.
Chas. Spaulding
Albert D. Groff

INVENTORS.
J. Willard Pierce
Israel L. G. Rice

UNITED STATES PATENT OFFICE.

J. WILLARD PIERCE AND ISRAEL L. G. RICE, OF BROOKLINE, MASS.

WHEEL-TIRE.

SPECIFICATION forming part of Letters Patent No. 340,612, dated April 27, 1886.

Application filed January 11, 1886. Serial No. 188,205. (No model.)

*To all whom it may concern:*

Be it known that we, J. WILLARD PIERCE and ISRAEL L. G. RICE, both citizens of the United States, residing in Brookline, county of Norfolk, and State of Massachusetts, have invented an Elastic Tire for Wheels of Vehicles, of which the following is a specification.

Our invention relates to an elastic tire for wheels of vehicles.

The object of the invention is to keep the fellies, spokes, and hub of a wheel together when they become shrunken. We attain this object by the devices illustrated in the accompanying drawings, in which—

Figure 6:
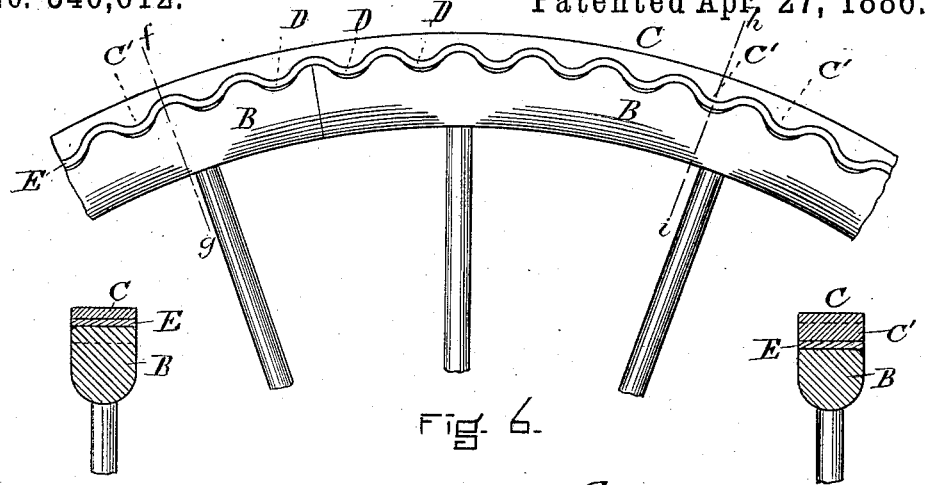
Figure 9:
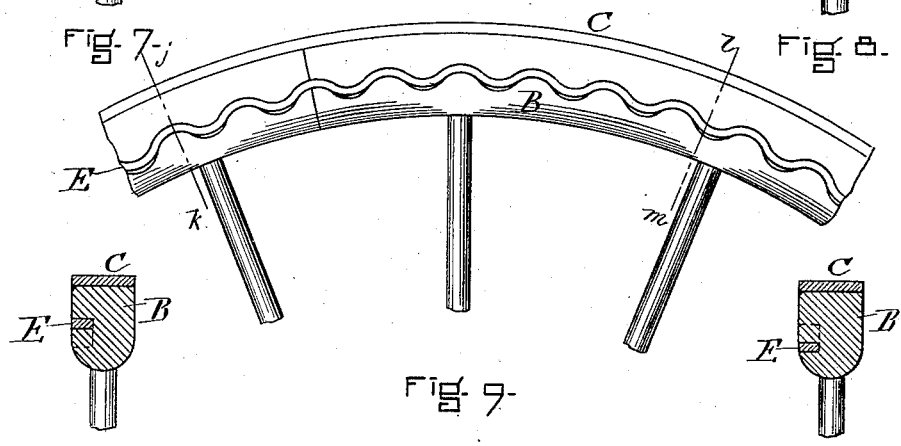
Figure 12:
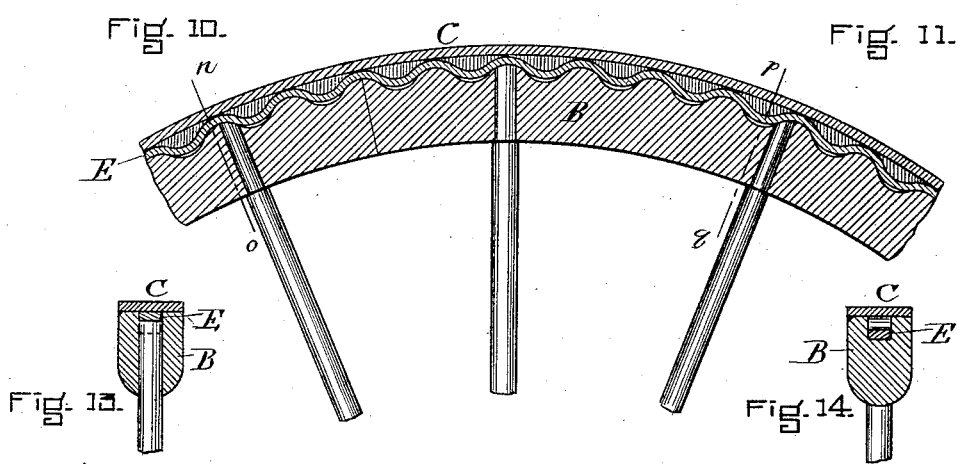

Figure 1 is a vertical view of a wheel embodying our invention. Fig. 2 is a cross-section through the line $a\,b$ of the outer smooth tire, the inner elastic corrugated tire, and grooved felly. Fig. 3 is an enlarged sectional view of the outer smooth tire, inner corrugated elastic tire, and a portion of a grooved felly. Fig. 4 is a detailed cross-section through the line $c\,d$ of the outer smooth tire, the inner corrugated elastic tire, and the grooved felly. Fig. 5 is a detail sectional view of the outer smooth tire, the inner corrugated elastic tire, and the grooved felly, showing these parts separated from one another. Fig. 6 is a modification of the invention, which consists of the outer smooth tire being made with inner corrugations to rest in the corrugations of the corrugated inner tire. Fig. 7 is a cross-section of the same through the line $f\,g$. Fig. 8 is a cross-section of the same through the line $h\,i$. Fig. 9 is a sectional view of another modification of the invention, showing the corrugated tire inserted into the side of the fellies. Fig. 10 is a cross-section of the same through the line $j\,k$. Fig. 11 is a cross-section of the same through the line $l\,m$. Fig. 12 is a sectional view of another modification of the invention, showing the corrugated spring-tire inserted into a corrugated groove cut in the center of the face of the fellies. Fig. 13 is a cross-section of the same through the line $n\,o$. Fig. 14 is a cross-section through the line $p\,q$.

Similar letters refer to similar parts throughout the entire views.

The wheel A, having fellies B B B and outer tire, C, has corrugations D D D cut in the rim of the fellies. Into these corrugations is driven or fitted an elastic corrugated tire, E. This tire is made preferably of good spring-steel, and when the wheel becomes shrunken the action of this elastic tire is to force the fellies against the spokes and the spokes against the hub, thus binding the various parts firmly together, and in case the outer smooth tire comes off the wheel the inner elastic tire will prevent the wheel from breaking, thus preventing accidents.

In carrying our invention into operation we take a wheel made in the usual way, and before putting on the outer tire we cut corrugations in the rim of the fellies. We also bevel slightly the edges of the fellies, so that the elastic corrugated tire may be readily driven onto the wheel. Then we shrink onto the wheel in the usual way the smooth outer tire. It is better to have the corrugations cut a little deeper in the rim of the fellies than the depth of the corrugations in the elastic tire, so as to allow space for the tire to contract as the wheel shrinks.

The modification of the invention illustrated in Figs. 6, 7, and 8 shows the outer smooth tire, C, with inner corrugations, C' C' C', fitting into the corrugations of the elastic hoop.

The modification of the invention illustrated in Figs. 9, 10, and 11 shows the elastic tire E inserted into the side of the fellies B B B, the fellies being corrugated on the side instead of the rim.

The modification of the invention illustrated in Figs. 12, 13, and 14 shows the elastic corrugated tire E inserted by being sprung or otherwise into a corrugated groove in the center of the rim of the fellies B B B.

There may be a number of modifications of this invention.

The elastic tire may be corrugated only in parts and the remaining parts left smooth; or it may not be corrugated at all. A spirally-wound wire or a spiral spring inserted into a groove in the felly may be used.

The principle of the invention consists in providing a wheel for vehicles with an inner spring-metal tire bent or corrugated so as to form a circular spring-tire adapted to hold the wheel together when it becomes dry and shrunken, and over this spring-tire is placed the ordinary tire.

What we claim as our invention, and desire to secure by Letters Patent, is—

1. The combination, in a wheel, of an inner tire made of spring metal, corrugated or bent, with a smooth outside tire, substantially as and for the purposes set forth.

2. The combination, in a wheel, of an inner tire made of spring metal, corrugated or bent, grooved fellies, and smooth outside tire, substantially as and for the purposes set forth.

3. The combination, in a wheel, of an elastic corrugated tire and corrugated fellies with a smooth tire, substantially as and for the purposes set forth.

J. WILLARD PIERCE.
ISRAEL L. G. RICE.

Witnesses:
CHAS. SPAULDING,
ALBERT D. GROVER.